United States Patent
Marioni

(10) Patent No.: US 7,454,985 B2
(45) Date of Patent: Nov. 25, 2008

(54) METHOD AND DEVICE FOR DETERMINING THE HYDRAULIC FLOW RATE IN A PUMP DRIVEN BY A SYNCHRONOUS ELECTRIC MOTOR

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 257 days.

(21) Appl. No.: 10/539,654

(22) PCT Filed: Aug. 30, 2004

(86) PCT No.: PCT/EP2004/009668

§ 371 (c)(1),
(2), (4) Date: Feb. 16, 2006

(87) PCT Pub. No.: WO2005/024240

PCT Pub. Date: Mar. 17, 2005

(65) Prior Publication Data

US 2006/0288772 A1   Dec. 28, 2006

(30) Foreign Application Priority Data

Sep. 4, 2003   (EP) ................... 03425571

(51) Int. Cl.
  *G01F 1/66* (2006.01)
  *H02P 6/08* (2006.01)
(52) U.S. Cl. .............. 73/861.77; 73/168; 73/195; 318/85; 318/98; 318/717
(58) Field of Classification Search ............ 73/168, 73/861.01, 195, 861.77; 318/45–47, 85, 318/98, 700, 717, 721

See application file for complete search history.

(56) References Cited

U.S. PATENT DOCUMENTS

| | | | | |
|---|---|---|---|---|
| 3,492,555 A | * | 1/1970 | Shibata | 318/705 |
| 4,740,738 A | * | 4/1988 | El-Antably et al. | 318/701 |
| 4,781,525 A | | 11/1988 | Hubbard et al. | |
| 5,099,697 A | * | 3/1992 | Agar | 73/861.04 |
| 5,122,715 A | * | 6/1992 | Kimura et al. | 318/138 |
| 5,679,906 A | * | 10/1997 | Van Cleve et al. | 73/861.353 |
| 5,728,951 A | * | 3/1998 | Van Cleve et al. | 73/861.354 |
| 6,053,705 A | * | 4/2000 | Schob et al. | 417/53 |
| 6,093,986 A | * | 7/2000 | Windhorn | 310/68 B |
| 6,239,563 B1 | * | 5/2001 | Kunz | 318/254 |

(Continued)

FOREIGN PATENT DOCUMENTS

DE   44 18 721 A1   11/1995

(Continued)

*Primary Examiner*—David A. Rogers
(74) *Attorney, Agent, or Firm*—Akerman Senterfitt

(57) ABSTRACT

The present invention relates to a method and relevant electronic device (10) for determining the hydraulic flow rate in a pump driven by a synchronous electric motor (12), said motor (12) being of the type comprising a rotor (14), equipped with a permanent magnet, which is rotation-driven by the electromagnetic field generated by a stator (16) equipped with pole pieces (18) with relevant windings. The method comprises an indirect measuring of the flow rate through the following steps of: acquiring at least one pump operation variable; comparing the value of said variable with a predetermined correlation table to hydraulic flow rate values and determining a corresponding flow rate value.

14 Claims, 7 Drawing Sheets

U.S. PATENT DOCUMENTS

| | | | |
|---|---|---|---|
| 6,692,535 B2 * | 2/2004 | Olivier | 73/861.79 |
| 6,710,562 B1 * | 3/2004 | Kalb et al. | 318/434 |
| 6,847,183 B2 * | 1/2005 | Marioni | 318/700 |
| 6,885,161 B2 * | 4/2005 | de Nanclares et al. | 318/254 |
| 2003/0145662 A1 * | 8/2003 | Olivier | 73/861.79 |
| 2003/0230999 A1 * | 12/2003 | de Nanclares et al. | 318/716 |

FOREIGN PATENT DOCUMENTS

EP 0 971 212 A1 1/2000

\* cited by examiner

METHOD AND DEVICE FOR DETERMINING THE HYDRAULIC FLOW RATE IN A PUMP DRIVEN BY A SYNCHRONOUS ELECTRIC MOTOR

FIELD OF APPLICATION

The present invention relates, in its more general aspect, to a pump driven by a synchronous electric motor, of the type wherein a rotor, equipped with a permanent magnet, is rotation-driven by the electromagnetic field generated by the stator, equipped with pole pieces with relevant windings.

In particular, this invention relates to a method and device for determining the hydraulic flow rate in a pump driven by a synchronous electric motor.

PRIOR ART

As it is well known to the skilled in the art, fluid circulation pumps are mounted for example in heating and/or conditioning systems, but also in household and industrial washing machines.

Their current production is almost performed with asynchronous motors. Models with synchronous motors have been introduced only recently.

In all these applications the pump flow rate, i.e. the load supported by the electric motor, varies in time, sometimes suddenly and unexpectedly. The motor operating conditions thus change.

For example, in the case of applications on washing machines, the pump must let a fluid mixture, wherein water and air percentages undergo some variations, circulate or be discharged. It is however advisable for the motor to operate always at a speed close to the highest efficiency speed, which also results in an energy saving for the user.

Moreover, too sharp load variations can also cause a temporary motor shutdown, which would require a manual or automatic intervention for a new start-up.

In order to obtain a steady speed, it would be very useful to have a measuring of the load, i.e. of the fluid hydraulic flow rate, second by second.

In the prior art several devices to measure the flow rate, even with continuous surveys, are known.

These flow rate meters are generally devices which are located in correspondence with the pump deliveries and, by exploiting several principles, they determine the volume of fluid flowing through a given section in a predetermined time.

A method to determine the pressure loss and the flow rate through a pump is described in the European patent application No. 0 971 212 in the name of Sulzer Electronics AG et al.

All these meters, although achieving the aim of measuring the flow rate, have however some drawbacks. First of all, it is necessary to provide on the delivery a certain area to house them. Moreover, the aim is to point out that, for checking the good operation thereof, these devices must undergo periodical preventive maintenance activities.

Other solutions can provide for example the use of current sensors to determine indirectly the pump flow rate by sensing a higher or lower current absorption by the stator windings.

This solution does not provide however precise and reliable measures.

A further prior art solution is disclosed in the European patent application no. 0 403 806 concerning a centrifugal pump or a fan to let a fluid circulate at controlled temperature, in particular in heating systems. Sensors for determining the fluid flow rate and temperature sensors for determining the fluid temperature are also provided. A controller associated to the electric motor processes the values received by the sensors to drive the motor in order to obtain an almost steady fluid temperature.

Also this solution requires the presence and the management of expensive sensors which complicate the structure of the pump and of the driving device of the relevant electric motor.

The problem underlying the present invention is to provide a method and relevant device for determining the flow rate in a pump driven by a synchronous electric motor, having such respective features as to allow all the drawbacks mentioned with reference to the prior art to be overcome.

SUMMARY OF THE INVENTION

The solution idea underlying the present invention is to perform an indirect measuring of the flow rate by sensing a pump operation variable correlated to the flow rate according to a predetermined non-linear correlation ratio being obtained experimentally.

On the basis of this solution idea the technical problem is solved, according to the present invention, by a method as previously indicated and characterised in that it comprises the following steps of:
    acquiring at least one pump operation variable;
    comparing the value of said variable with a predetermined correlation table to hydraulic flow rate values and determining a corresponding flow rate value.

More particularly, according to a specific embodiment of the present invention, the method comprises the steps of:
    acquiring a current value of load angle or delay $\theta$, i.e. of the phase shift angle between the network voltage applied to the motor terminals and the counter-electromotive force generated by adding the effects of the stator flux and of the flux induced by the rotor permanent magnet rotation;
    comparing said current value of load angle $\theta$ with a predetermined correlation table to hydraulic flow rate values and determining a corresponding current flow rate value.

The other features and the advantages of the method and device for determining the flow rate of a pump driven by a synchronous electric motor will be more apparent from the description of an embodiment thereof, given hereafter with reference to the attached drawings given by way of indicative, non-limiting example.

DETAILED DESCRIPTION OF A PREFERRED EMBODIMENT

Figure 1:
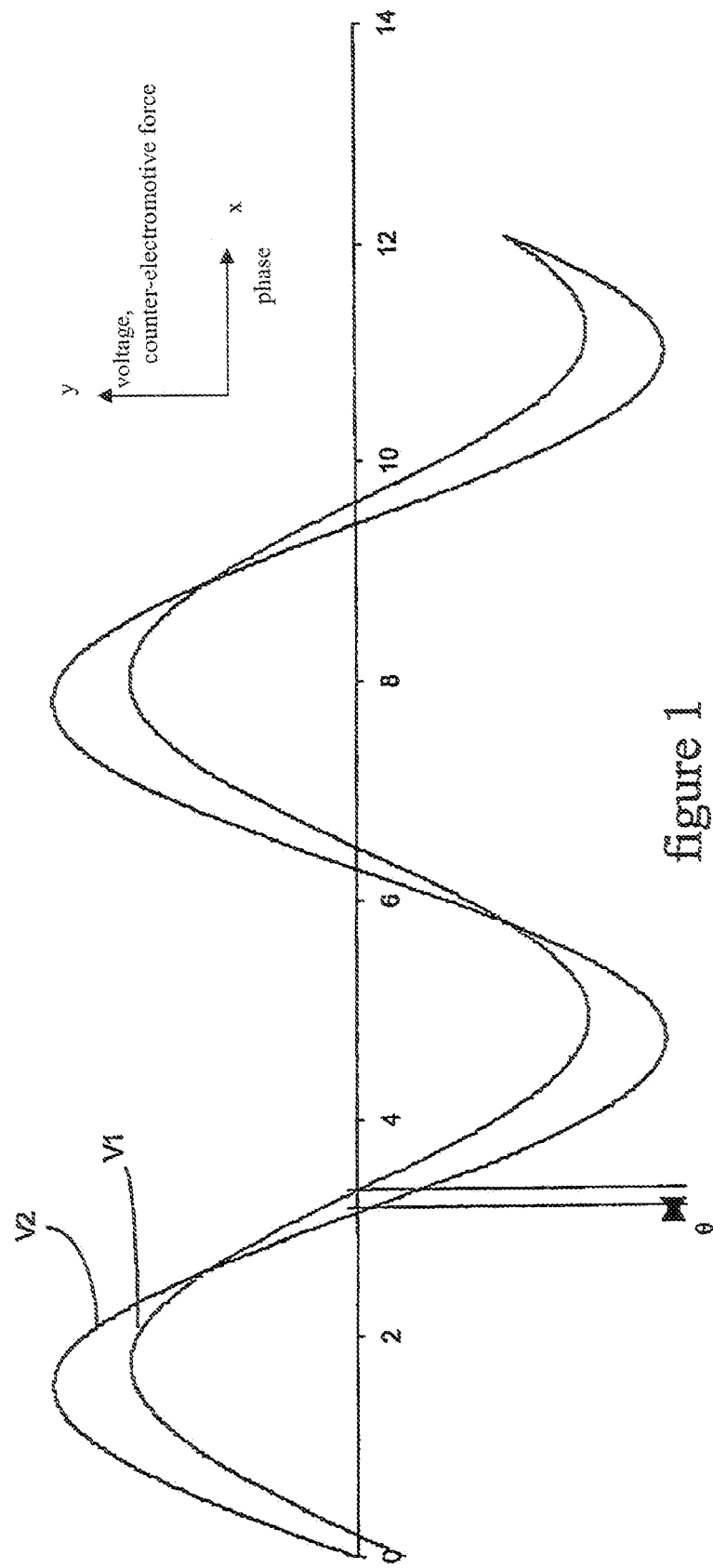
FIG. 1 schematically shows a voltage and counter-electromotive force diagram of a synchronous electric motor.
Figure 2:
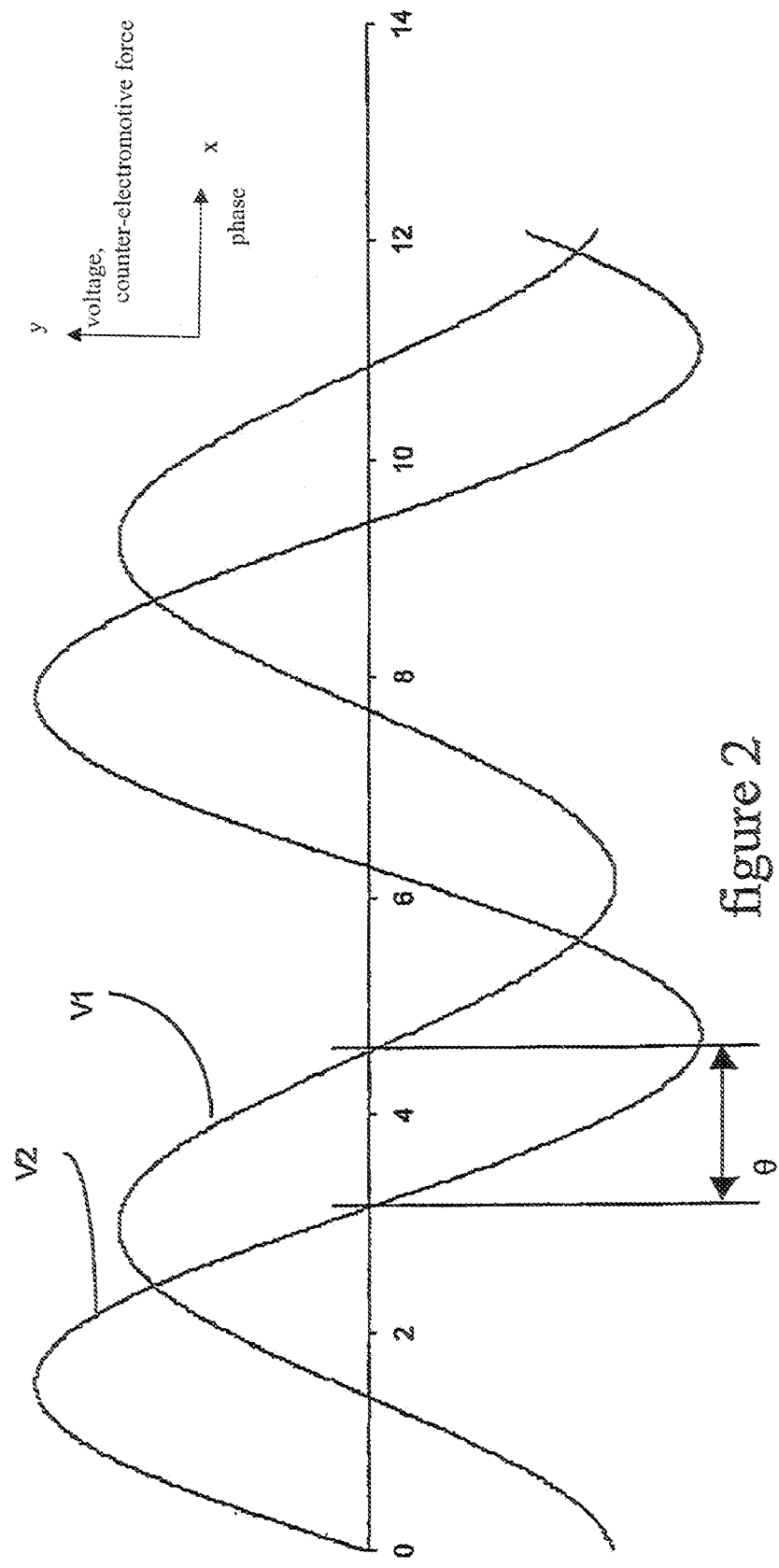
FIG. 2 schematically shows a voltage and counter-electromotive force diagram in a different operating step of a synchronous electric motor.
Figure 3:
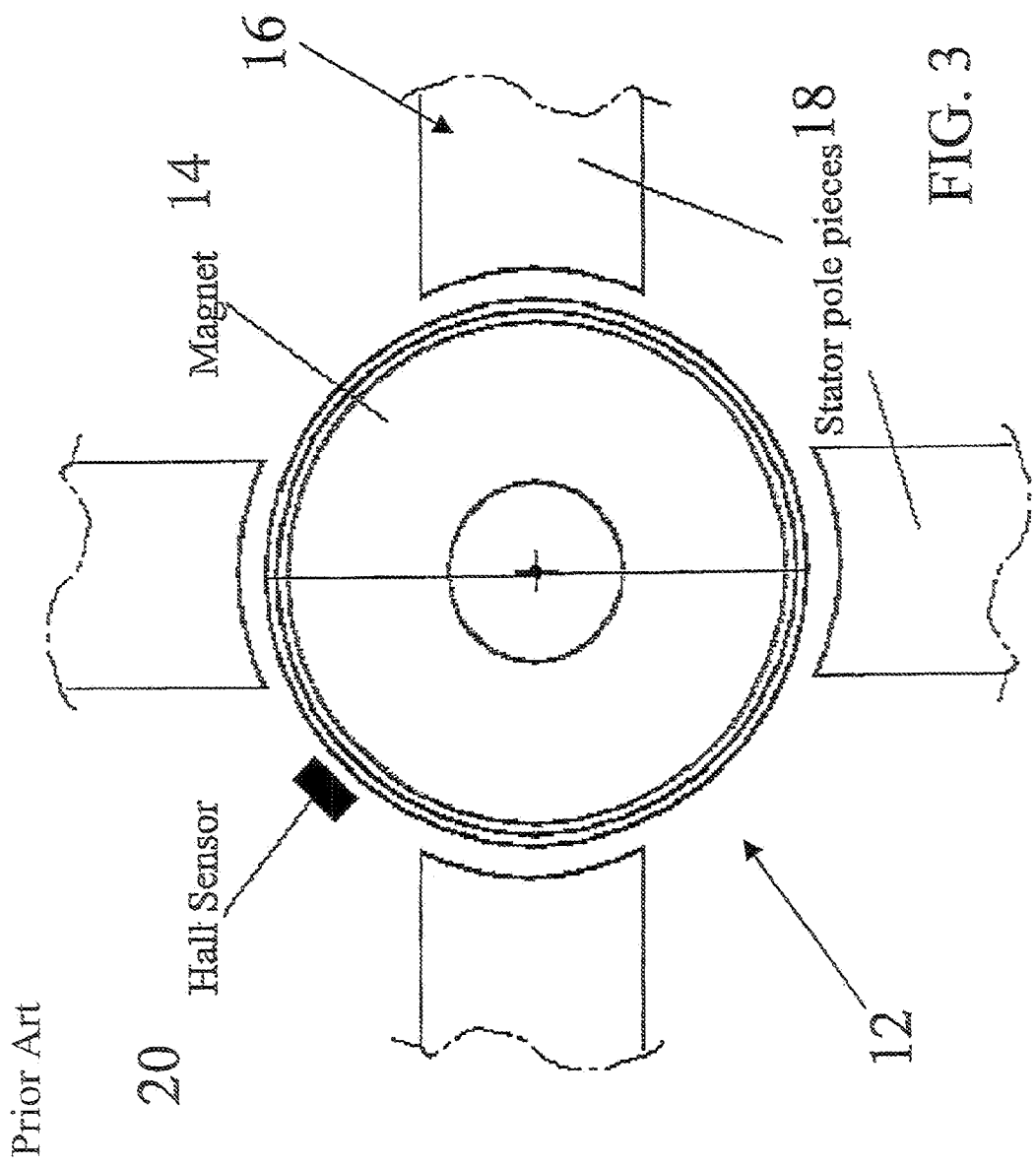
FIG. 3 schematically shows a synchronous electric motor equipped with a device, according to the invention, for determining the flow rate of a pump driven by that motor.
Figure 4:
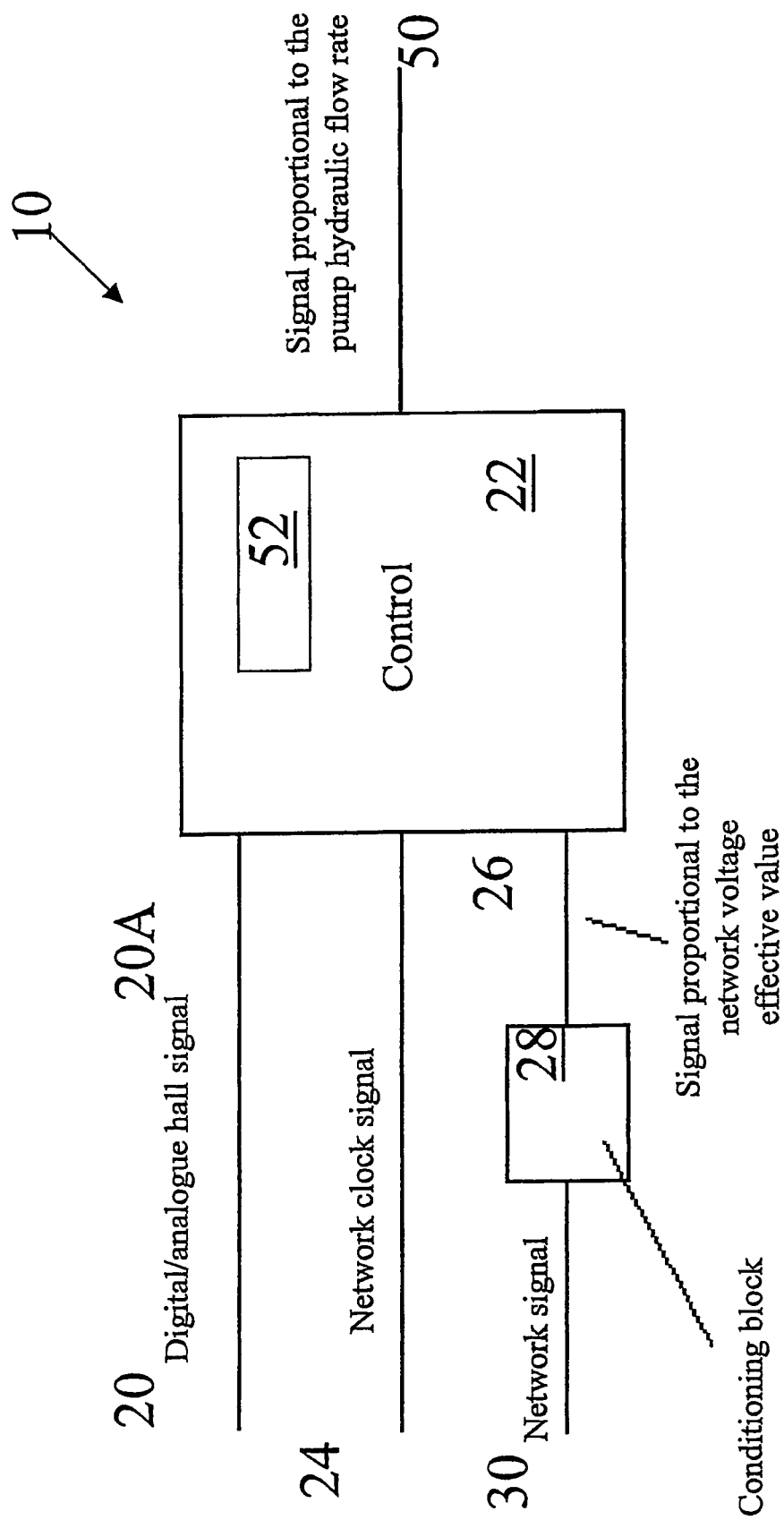
FIG. 4 shows a block diagram of a device according to the invention for determining the flow rate in a pump driven by a synchronous electric motor.

With initial reference to the example of FIG. 4, a device is shown, manufactured according to the present invention and globally indicated with 10, for determining the flow rate in a pump driven by a synchronous electric motor 12. The motor 12, visible in FIG. 3, is of the type comprising a rotor 14, equipped with a permanent magnet, which is rotation-driven by the electromagnetic field generated by a stator 16, equipped with pole pieces 18 with relevant windings.

The device 10 comprises a magnetic flux sensor 20 of the rotor 14, for example a Hall sensor, located on the stator 16 close to the rotor 14. The sensor 20 is connected to a processing unit 22, which outputs the value of the pump flow rate.

According to the present invention, to determine the flow rate in a pump driven by the synchronous electric motor 12 the processing unit 22 of the device 10 is used, which is associated to a memory portion storing experimental correlation data between flow rate values and the corresponding values of an operation variable of the pump motor, for example the load angle.

In practise, the method of the invention allows the flow rate of the fluid circulating in a pump driven by the synchronous motor 12 during the steady state operation thereof to be determined, by using a measuring of a pump operation variable, in particular the measuring of the load angle or delay θ.

As it is well known, this load angle θ represents the phase shift between the voltage applied to the terminals of the motor 12 and the counter-electromotive force generated by adding the effect of the stator 16 flux and of the flux induced by the rotor 14 permanent magnet rotation.

When the load applied to the axis of the pump connected to the motor 12 varies, also the torque applied to the rotor 14 of the motor 12 varies, modifying thus the phase shift angle between the counter-electromotive force and the network voltage, i.e. exactly the load angle θ.

The increase of the load angle is proportionally correlated to an increase of the hydraulic flow rate inside the pump, with a correlation at intervals linear. For example, an increase of the hydraulic flow rate involves a proportional increase of the load angle; vice versa, a decrease of the load angle corresponds to a decrease of the relevant flow rate.

According to the invention, a correlation between the flow rate values and the corresponding load angle values is predetermined: this correlation can be determined through experimental tests, or also through theoretical simulations or computer simulations, preferably during a calibration step preferably performed in the pump production site.

In greater detail, as it is well shown in FIG. 4, the processing unit 22, besides being connected to the sensor 20, receives at its input also a network synchronism signal 24 and a signal being proportional to the effective value of the network voltage 26.

A digital Hall sensor 20 measures the passing of magnetic flux peak of the rotor 14. Knowing that the latter is delayed by 90° with respect to the counter-electromotive force, the load angle θ is precisely determined as phase shift between the voltage applied to the terminals of the motor 12, which is known thanks to the network synchronism signal 24, and the counter-electromotive force generated by adding the effects of the stator 16 flux and of the flux induced by the rotor 14 permanent magnet rotation.

The phase shift θ is thus determined by the processing unit 22 by taking the network synchronism signal 24 as reference, which is a square-waved signal with rising and falling edges coinciding with the passage through zero of the network voltage.

The attention is drawn on the fact that the digital Hall sensor 20 outputs a square-waved signal, with rising and falling edges coinciding with the polarity reversal of the rotor 14 permanent magnet during the rotation.

The time elapsing between the edge of the synchronism signal 24 and the edge of the sensor signal 20, indicating the position of the rotor 14, is proportional to the load angle θ

Nevertheless, this time varies according to the flow rate, the supply voltage of the motor 12 and the operative temperature of the rotor 14 magnet.

It is worth specifying here that the dependence of the load angle θ on the flow rate is linked to the pump electro-physical features. Omitting the constructional aspects (like hydraulics, stator windings and mechanical parts) which, in a consolidated product, influence the load angle θ mainly because of production tolerances and however with small and relatively steady values, the other critical parameters directly influencing the load angle variation are exactly the network voltage and the magnet temperature of the rotor 14. In the case of pumps with synchronous motor 12 and rotor 14 dipped in a working fluid, the magnet temperature corresponds to the temperature of this working fluid.

If the network voltage decreases, also the intensity of the magnetic flux produced by the stator 16 decreases, with a subsequent underexcitation of the motor 12.

This underexcitation makes it more difficult to keep the synchronism condition in the motor 12 and it is interpreted as an increase of the work load, directly resulting in an increase of the load angle.

Vice versa, an increase of the network voltage involves an overexcitation of the motor 12 and thus a decrease of the load angle.

The dependence on the working fluid temperature is due to the fact that the ferromagnetic material composing the rotor 14 has a residual magnetic induction $B_R$ varying according to the temperature.

An increase of the operative temperature of the rotor 14 magnet let the $B_R$ decrease affecting in turn the intensity of the concatenated flux, decreasing it and bringing the motor 12 back to a condition which is similar to the case of the supply voltage decrease.

Then, as for the load angle, a temperature increase will cause an increase thereof, and vice versa.

In order to discriminate if the load angle θ variation is due to the supply voltage or if this variation is due to a change of the pump flow rate, the signal being proportional to the effective value of the network voltage 26 is used.

This signal 26 is obtained for example by means of a conditioning block 28, like a voltage regulator hardware circuit, from a network voltage signal 30. This signal 26 allows the processing unit 22 to be brought back to the effective supply value. In this way, the processing unit 22 is capable of providing a signal being proportional to the hydraulic flow rate and completely independent from the supply voltage.

On the contrary, in order to discriminate if the load angle θ variation is due to the thermal drift or if this variation is due to a change of the pump flow rate, an analogue Hall sensor 20A must be used.

The analogue Hall sensor 20A, besides allowing the polarity reversal of the rotor 14 magnet to be read, is capable of outputting a sinusoidal signal whose amplitude is proportional to the residual induction $B_R$ of the ferromagnetic material composing the rotor 14.

As already mentioned above, the residual induction $B_R$ of a magnet is strictly dependent on the operative temperature, therefore with this signal the processing unit 22 is capable of further distinguishing the load angle variation due to a flow rate change from the load angle variation due to a temperature change.

Substantially, the method of the invention, implemented by means of the processing unit 22 of the device 10, comprises the following steps of:
- acquiring a current value of load angle θ;
- comparing that current load angle value with a predetermined correlation table to flow rate values and determining a corresponding current flow rate value.

The acquisition can be performed continually or through a discrete sampling.

For a more precise and secure flow rate determination, the method comprises the steps of:
- acquiring current values of load angles θ, network voltage and rotor 14 magnet temperature;
- comparing the current value of said load angle with a predetermined correlation table to flow rate values;
- correcting the flow rate values according to the values of the network voltage and/or of the rotor magnet temperature and determining a current flow rate value.

Event more generally, the present invention relates to a method for determining the flow rate in a pump driven by a synchronous electric motor, comprising an indirect measuring of said flow rate through the following steps of:
- acquiring at least one pump operation variable;
- comparing that current value of said variable with a predetermined correlation table at flow rate values and determining a corresponding flow rate value.

Preferably, said at least one operation variable is a value being normally acquired in the control units of prior art pumps, or it is a value which can be easily determined at low costs: for example the value of the load angle θ, obtained from the Hall sensor 20 signal, is particularly suitable for the implementation of the method of the present invention.

Figure 5:
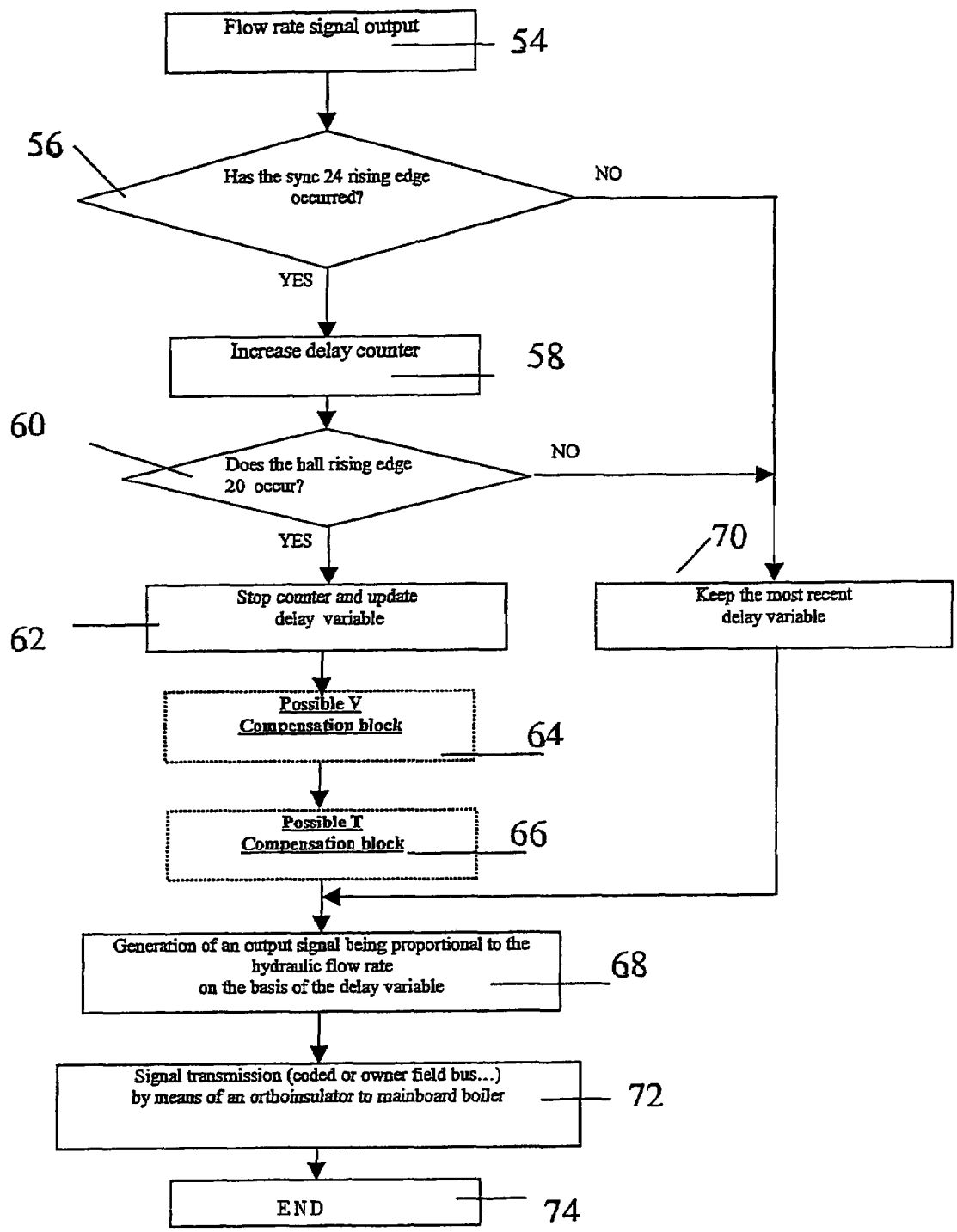
FIGS. 5, 6 and 7 are flowcharts of the method, according to the invention, for determining the flow rate of a pump driven by a synchronous electric motor.
Figure 6:
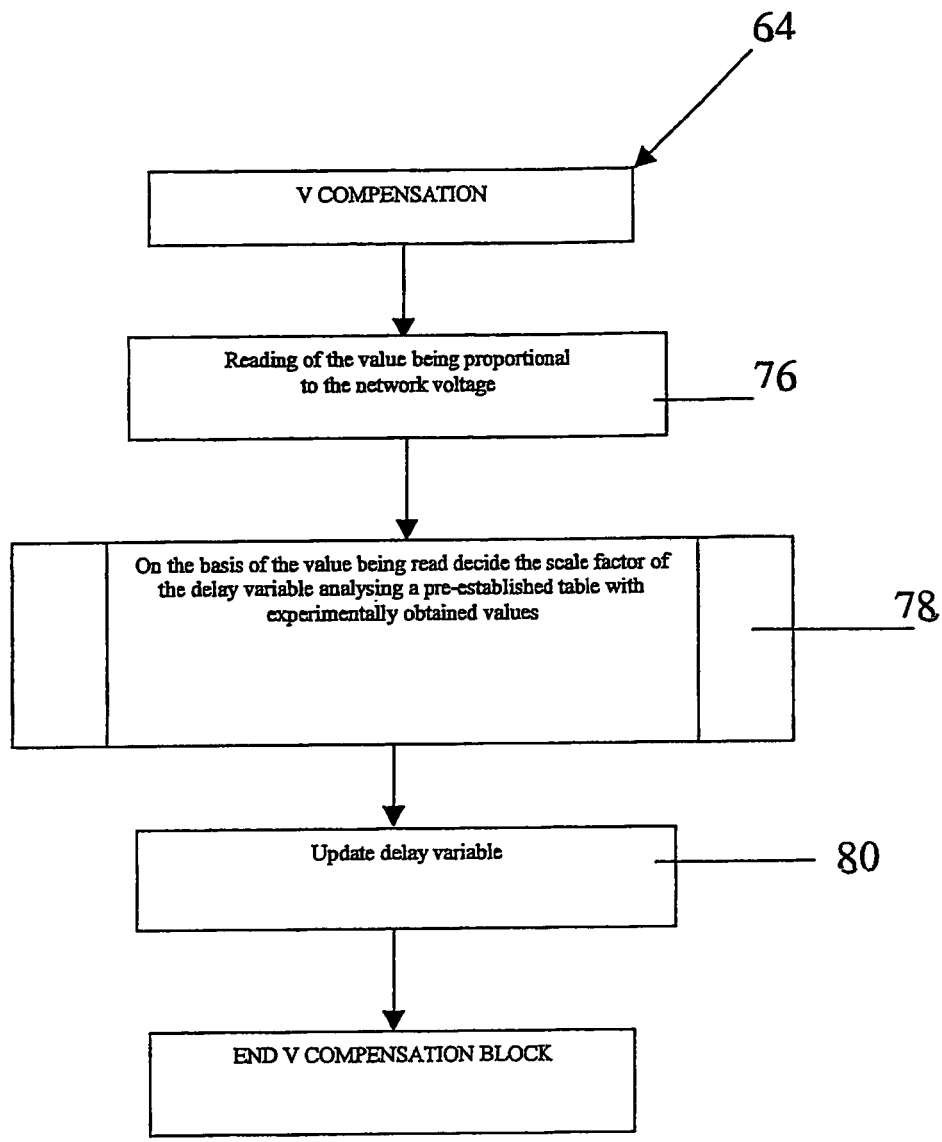
Figure 7:
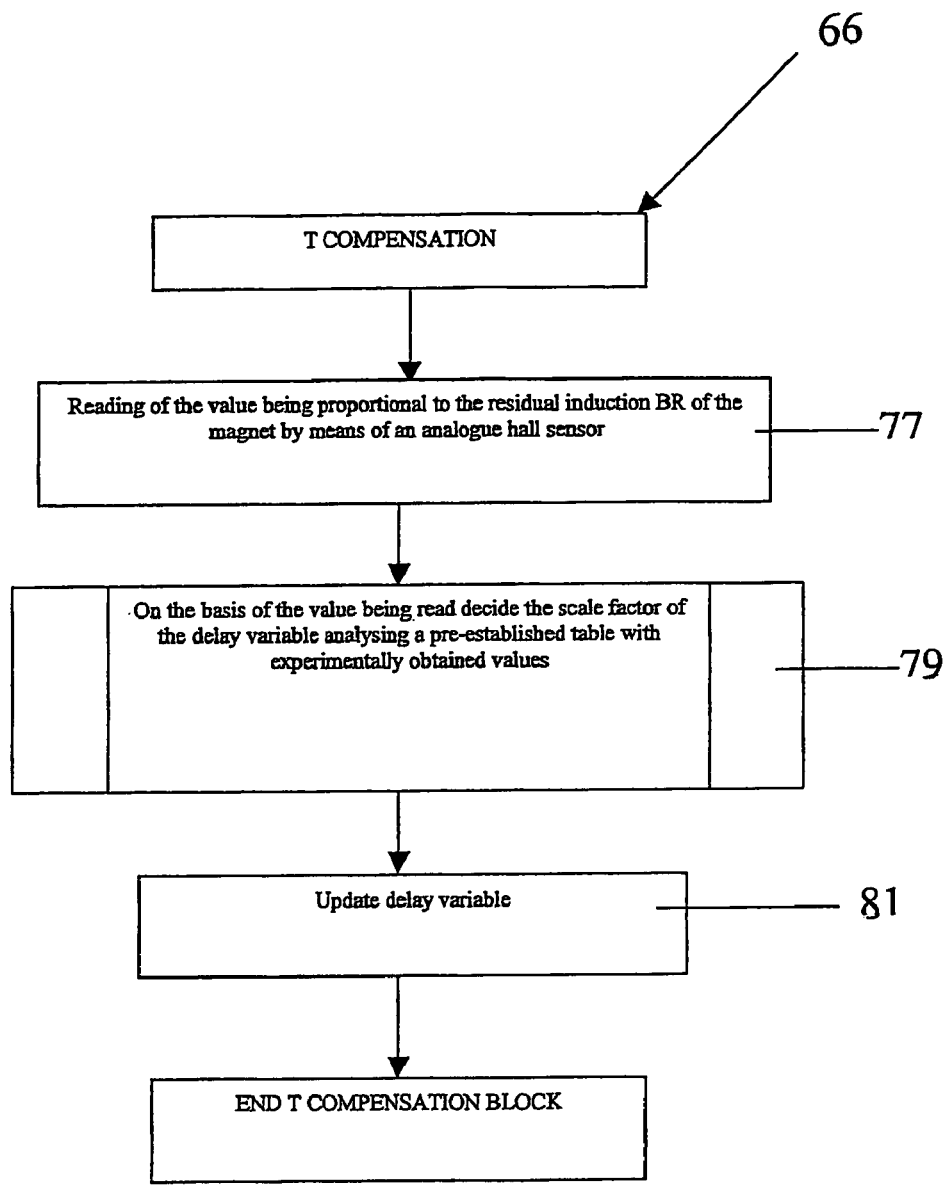

Referring now specifically to the flowcharts of FIGS. 5 6 and 7, the algorithmic flow of the processing unit 22 is now described in detail, which allows the method of the invention to be implemented, in the example in which the operation variable is the load angle θ.

Substantially, a flow rate output signal 50 is generated proportionally to the value of a counter 52 of the load angle θ, incorporated in the unit 22, and thus proportionally to the hydraulic flow rate, grounding the processing on a table formed of experimentally obtained values.

Knowing the time taken by the unit 22 to perform an interrupt routine, i.e. the execution time of the program schematically shown in FIG. 5, and multiplying it by the value of the delay θ counter 52, the time elapsing between an edge of the network synchronis signal 24 and an edge of the Hall sensor 20 output signal is obtained, bringing it to the load angle θ.

The interrupt routine of FIG. 5 starts from an initial condition, block 54, wherein an initial value of the flow rate output signal 50 is indicated.

A first testing step occurs, block 56, wherein it is estimated if a rising edge of the network synchronism signal 24 has arrived.

If so, an increase of the counter 52 of the angle θ occurs in the block 58. A second testing step is then performed, block 60, wherein it is estimated if a rising edge of the Hall sensor 20 output signal has arrived.

If so, a calculation block 62 is turned on, through which the counter 52 is shut down and the delay θ variable is updated.

For completeness of the description, the existence of two procedures, both optional, respectively shown in FIGS. 6 and 7, is now also indicated: a first voltage compensation procedure 64 and a second temperature compensation procedure 66. The relevant signal processing flow is shown in detail in FIGS. 6 and 7, but it will be shown hereafter not to interrupt now the description of the main interrupt routine.

At this point, the flow reaches a generation block 68 of the output signal which is proportional to the hydraulic flow rate on the basis of the delay θ variable.

This generation block 68 is reached also in case of negative answer in the first testing block 56 or in the second testing block 60, after passing through a keeping block 70, wherein the delay θ variable is kept at its most recent value.

A transmission block 72 allows the transmission out of the processing unit 22 of the output signal generated in the generation block 68.

A shutdown block 74 of the interrupt routine is thus reached.

FIG. 6 shows a flowchart describing in detail the processing inside the voltage compensation block 64 of FIG. 5.

After a reading step, block 76, of a value being proportional to the network voltage, an allocation block 78 of a first scale factor to the delay θ variable is reached. This allocation is performed on the basis of the value obtained in the reading block 76 and of a pre-established table, obtained with experimental values.

An update block 80 is then reached, wherein the delay θ variable is modified according to the first scale factor of the allocation block 78.

FIG. 7 shows the flowchart describing in detail the processing inside the temperature compensation block 66 of FIG. 5.

After reading, block 77, a value being proportional to the magnet residual magnetic induction $B_R$, coming from the analogue Hall sensor 20, an allocation block 79 of a second scale factor to the delay θ variable is reached. This second allocation is performed on the basis of the value obtained in the reading block 77 and of a pre-established table, obtained with experimental values.

An update block 81 is then reached, wherein the delay θ variable is modified according to the second scale factor of the allocation block 79.

The aim is also to point out how the hydraulic flow rate value obtained from the processing unit 22 can be reused by the pump control unit for regulating the power absorbed by the pump (in this case the electronic control device comprises said processing unit 22), or it can be transmitted outwards to another control device for a further processing or it can be used for both previous options.

The main advantage achieved by the method for determining the flow rate of a pump driven by a synchronous electric motor of the present invention is that it allows the flow rate to be estimated in an unusually rapid and reliable way.

The above-described method and device for determining the flow rate in a pump driven by a synchronous electric motor can undergo some modifications, all within the reach of the skilled in the art and falling within the scope of protection of the present invention, as defined in the following claims.

The invention claimed is:

1. A method for determining the hydraulic flow rate in a pump driven by a synchronous electric motor, said motor being of the type comprising a rotor, equipped with a permanent magnet, which is rotation-driven by the electromagnetic field generated by a stator equipped with pole pieces with relevant windings, the method comprising the step of:
  indirect measuring of said flow rate through the acquiring at least one pump operation variable,
  comparing the value of said variable within a predetermined correlation table and determining a corresponding flow rate value, and
  determining a corresponding flow rate value wherein said step of acquiring said at least one pump operation variable acquires a load angle or delay θ, i.e. a phase shift angle between a network voltage applied to the motor terminals and the counter-electromotive force generated by adding the effects of the stator flux and of the flux induced by the rotor permanent magnet rotation and in that said correlation table links flow rate values and load angle values.

2. A method for determining the flow rate in a pump according to claim 1, further comprising a calibration step wherein said correlation table is filled by means of experimental tests, theoretical simulations or computer simulations.

3. A method for determining the flow rate in a pump according to claim 1, wherein said step of acquiring said load angle or delay θ occurs continually.

4. A method for determining the flow rate in a pump according to claim 1, further comprising a step of acquiring a further pump operation variable like a network voltage applied to the terminals of the motor.

5. A method for determining the flow rate in a pump according to claim 1, further comprising a step of acquiring a further pump operation variable like the magnet temperature of the rotor.

6. A method for determining the flow rate in a pump according to claim 1, further comprising a step of compensating said flow rate value when the motor electric supply voltage varies; this compensation being obtained by means of a further predetermined correlation table.

7. A method for determining the flow rate in a pump according to claim 1, further comprising a step of measuring a temperature of said rotor to compensate the value of said flow rate when the temperature changes and by means of a further predetermined correlation table.

8. A method for determining the flow rate in a pump according to claim 1, further comprising a step of sensing a signal being proportional to the residual induction of the ferromagnetic material of the rotor and dependent on the operative temperature, by means of an analogue Hall sensor.

9. An electronic device for determining the hydraulic flow rate of a pump driven by a synchronous electric motor, said motor being of the type comprising a rotor equipped with a permanent magnet, which is rotation-driven by the electromagnetic field generated by a stator equipped with pole pieces with relevant windings, and comprising:
   a processing unit receiving at its input a first signal coming from a magnetic flux sensor of the rotor and being equipped with or associated to a memory portion storing a correlation table linking hydraulic flow rate values and values of an operation variable of the pump motor
   wherein said pump operation variable is a load angle or delay θ, i.e. a phase shift angle between a network synchronism signal and a counter-electromotive force generated by adding the effects of the stator flux and of the flux induced by the rotor permanent magnet rotation, and
   wherein said processing unit compares said load angle unit said operation variable value stored in said correlation table in order to determine a corresponding hydraulic flow rate value.

10. An electronic device according to claim 9, wherein said sensor is a digital Hall sensor.

11. An electronic device according to claim 9, wherein said sensor is an analogue Hall sensor.

12. An electronic device according to claim 9, wherein it has a third signal input to receive a signal being proportional to the effective value of the network voltage obtained by means of a voltage regulator to generate a signal (50) being proportional to the hydraulic flow rate completely independent from the electric supply voltage.

13. An electronic device according to claim 11, further comprising an inner counter to increase the count of the load angle θ at each rising edge of the network clock signal.

14. An electronic device according to claim 11, wherein said analogue sensor detects a signal being proportional to the residual induction of the ferromagnetic material of the rotor and dependent on the operative temperature.

* * * * *